3,477,824
BURNER AND APPARATUS FOR REFORMING HYDROCARBONS
Robert D. Reed, Tulsa, Okla., assignor to John Zink Company, Tulsa, Okla., a corporation of Delaware
Filed Dec. 15, 1966, Ser. No. 602,063
Int. Cl. B01j 9/00; F23d 15/00
U.S. Cl. 23—277      3 Claims

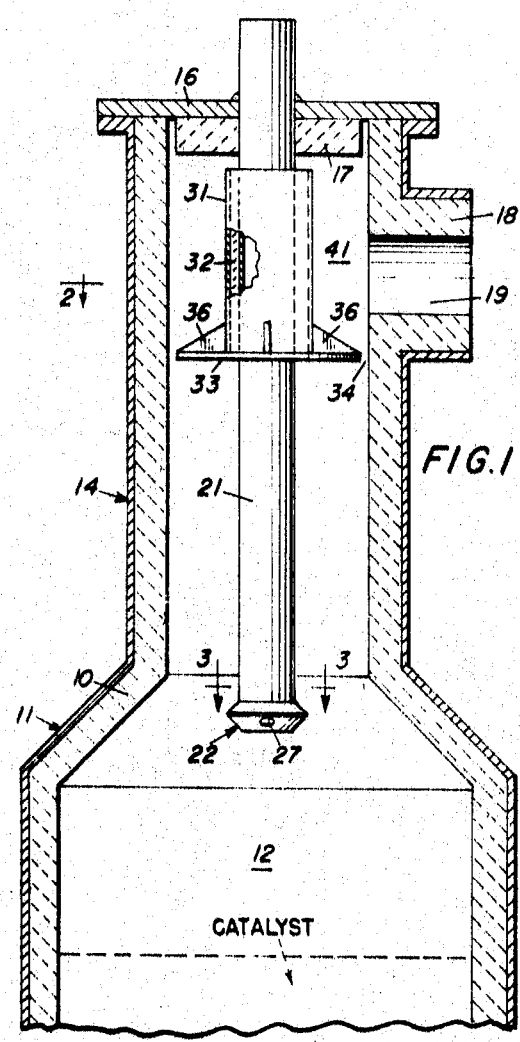
FIG.1
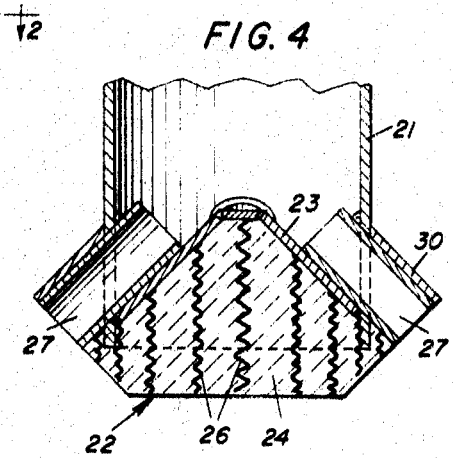
FIG.4
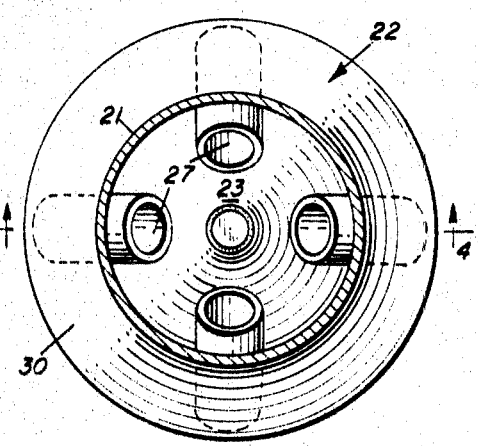
FIG.3
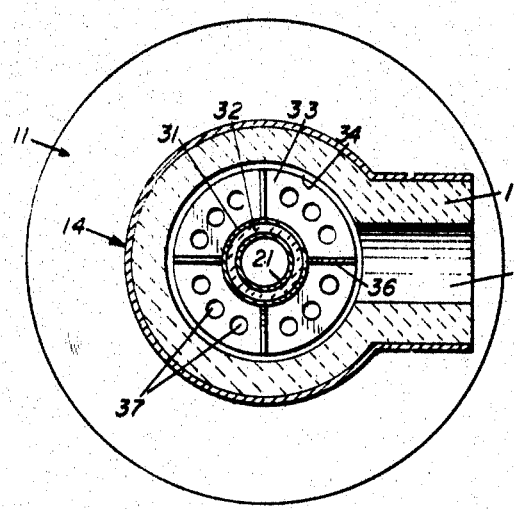
FIG.2
INVENTOR
ROBERT D. REED
BY 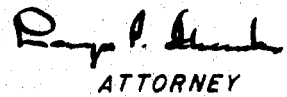
ATTORNEY Nov. 11, 1969  R. D. REED  3,477,824
BURNER AND APPARATUS FOR REFORMING HYDROCARBONS
Filed Dec. 15, 1966  2 Sheets-Sheet 2
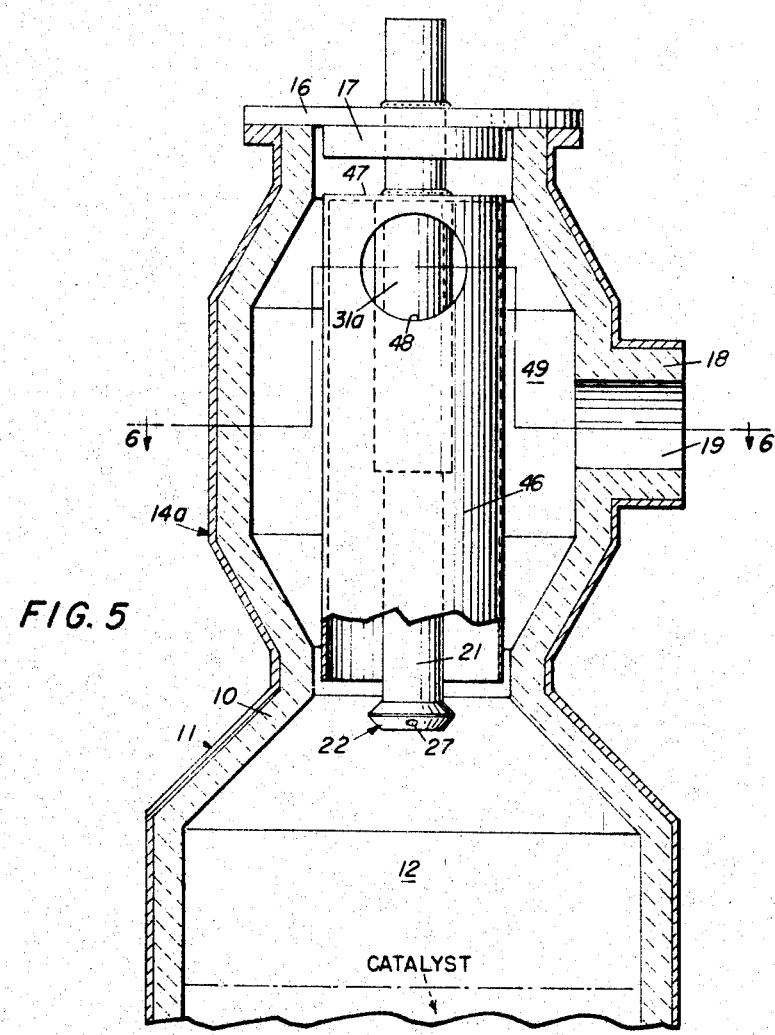
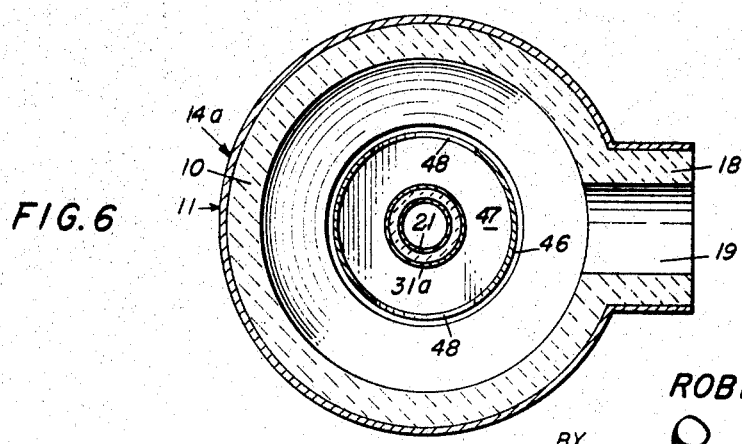
INVENTOR
ROBERT D. REED
BY
ATTORNEY United States Patent Office 3,477,824
Patented Nov. 11, 1969

ABSTRACT OF THE DISCLOSURE

Apparatus for the reformation of the hydrocarbons wherein the effluent from a Primary Reformer is guided into impact engagement with structure which serves to protect a portion of the apparatus from the heat of the effluent and structure is provided for insuring quiescent flow of the effluent into the presence of the burner where additional hydrogen is produced.

---

The present invention relates to apparatus which is useful in a process of forming anhydrous ammonia by the reformation of a hydrocarbon such as methane and the invention more specifically pertains to a burner assembly for developing temperatures at levels to convert substantially all of the methane to carbon monoxide and hydrogen which may be combined with nitrogen to form anhydrous ammonia.

In the synthesis of ammonia it has been a practice to reform methane with steam to obtain hydrogen for combination with nitrogen to form anhydrous ammonia and the reaction is generally:

$$CH_4 + H_2O = CO + 3H_2$$

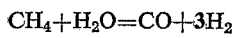

Such steps are carried out in apparatus referred to as a Primary Reformer which adds heat to the mixture of steam and methane in the presence of a catalyst. The heat level that may be attained in such apparatus is limited and a large portion of the methane is not reacted. In order to obtain reaction of substantially all of the methane it is necessary to utilize a Secondary Reformer in which the carbon monoxide, hydrogen and methane effluent from the Primary Reformer is burned by the introduction of air to provide a temperature level of at least twenty-two hundred degrees Fahrenheit. At such temperatures the effluent from the Primary Reformer in the presence of the catalyst reacts with the residual methane to produce additional hydrogen and carbon monoxide. The hydrogen thus produced is combined with nitrogen for the production of anhydrous ammonia.

It is an object of the present invention to provide apparatus including a burner and means for guiding air or a mixture of air and steam to a position for release in the presence of a catalyst and for guiding the effluent from a Primary Reformer an distributing it in the air to provide for burning of the combustible components of the effluent in the zone where it moves into the presence of the catalyst to promote reformation of the hydrocarbon.

A further object of the invention is to provide means for dissipating the inertia of the effluent upon entry into the apparatus to thereby provide for distribution of the effluent throughout the interior of the apparatus prior to its movement into the presence of the catalyst and into the zone where the reaction takes place.

Another object of the invention is to provide structure within the apparatus for avoiding heat damage to the elements as a consequence of the temperature of the incoming effluent and for guiding it to the presence of the burner head.

Other objects and features of the invention will be appreciated and become apparent as the present disclosure proceeds and upon consideration of the accompanying drawings taken in conjunction with the following detailed description wherein several embodiments of the invention are disclosed.

In the drawings:

FIG. 1 is an axial sectional view of apparatus embodying the invention.

FIG. 2 is a sectional plan view taken on the line 2—2 of FIG. 1.

FIG. 3 is a sectional view on a larger scale and taken on the line 3—3 of FIG. 1.

FIG. 4 is a vertical sectional view taken on the line 4—4 of FIG. 3

FIG. 5 is a view similar to FIG. 1 showing a modification.

FIG. 6 is a sectional plan view taken on the line 6—6 of FIG. 5.

The invention is directed to apparatus for burning the combustibles of an effluent from a Primary Reformer and includes a housing 11 formed of metal such as carbon steel lined with refractory material 10 and providing a chamber 12 adapted to contain a catalyst and wherein the reaction of the components of the effluent takes place. The housing includes a generally cylindrical neck portion 14 which is adapted to be closed by a disc-shaped cover member 16 lined on its inner face with refractory material 17. A radially disposed fitting 18 carried by the neck portion 14 provides an inlet opening 19 for the effluent.

A tubular element 21 extends through the cover member 16 and depends through the neck portion of the housing and along the axis thereof. The tubular element 21 is desirably formed of a heat resistant alloy and may be welded to the cover member 16 so as to be supported in the proper position within the housing. The lower end portion of the tubular element 21 carries a burner head 22 and is disposed in the chamber 12 as shown in FIG. 1. The burner head as best shown in FIGS. 3 and 4 includes a conical shaped member 23 formed of a heat resistance alloy attached to the tubular element 21 in any suitable manner such as by welding. The apex of the conical shaped member 23 is disposed along the axis of the tubular element 21 and the area thereunder is filled with refractory material 24. This refractory body 24 may be held in place by means of hangers 26 which are of undulating character and embedded in the ceramic material. A plurality of tubes 27 form elements of the burner head and these tubes extend downwardly through openings in the tubular element 21 and may be welded thereto and welded to the inclined surface of the member 23. The tubes 27 are circumferentially spaced from each other and the axis of each tube 27 slopes downwardly and outwardly from the axis of the tubular element 21. A frusto-conical shield 30 may be provided to overlie the outer ends of the discharge tubes 27.

The effluent as it enters the inlet 19 often has a temperature as great as fifteen hundred degrees Fahrenheit and the linear velocity of the effluent is in the neighborhood of one hundred feet per second. In order to protect the tubular element 21 means is provided around the tubular element 21 for heat protection. Such means may take the form of a cylindrical shaped jacket 31 formed of a heat resistant alloy which surrounds the tubular element 21 in spaced relationship. The annular space between the jacket 31 and the exterior of the tubular element 21 is filled with refractory material 32 as shown in FIGS. 1 and 2. The jacket 31 has an axial dimension greater than the area of the inlet opening 19.

The lower end of the jacket 31 carries a disc-shaped member 33 which has a diameter less than the internal diameter of the neck 14 of the housing to provide an annular space 34 at the perimeter of the disc member 33. The disc 33 may be welded to the tubular element 21 and gusset webs 36 serve to join the member 33 with the jacket 31. A plurality of circumferentially spaced holes 37 (FIG. 2) are provided through the disc member and the area of the annular space 34 plus the total area of the holes 37 is approximately one and one-half times the area of the inlet opening 19.

In operation air or a mixture of air and steam enters the tubular element 21 and the temperature of this gaseous medium may range from about three hundred to about eleven hundred degrees Fahrenheit and the rate of flow is at about one hundred feet per second. This medium moves downwardly in the tubular member 21 and escapes through the discharge tubes 27 to provide a pattern which flares outwardly in proceeding downwardly from the burner head 22. The effluent from a Primary Reform is at a temperature level significantly greater than the auto-ignition temperature of any of the combustibles contained therein. The entering effluent moves into the plenum 41 where some of the inertia is dissipated by impact against the exterior of the jacket 31. The pressure within the chamber 41 is greater than that below the disc member 33. Thus there is a pressure drop across the holes 37 and a pressure drop as the effluent moves through the annular space 34. This pressure drop is great enough to virtually dissipate the inertia upset in the chamber 41 so that the flow of the effluent below the disc 33 is quiescent and virtually uninfluenced by the turbulence within the chamber 41. The descending effluent thus flows substantially uniformly downwardly around the burner head 22. The jacket 31 and the insulation 32 therein serves to protect the tubular element 21 from the heat of the incoming effluent and prevents distortion and warping of the tubular element.

The air entering the tubular element 21 constitutes but a small fraction of that which would permit burning of all combustibles present in the effluent. The quantity of air admitted is such that it will elevate the temperature of the mixed flow after burning to approximately twenty-two hundred degrees Fahrenheit. Burning thus takes place in the vicinity of the catalyst to convert the hydrocarbon into carbon dioxide and hydrogen.

The structure shown in FIGS. 5 and 6 provides a modified assembly for dissipating the energy of the incoming effluent and for protecting the tubular element 21. In this embodiment the housing 11 has an enlarged neck portion 14a which provides space for accommodating a cylindrical shaped shroud 46 which is disposed concentrically about the tubular element 27. The shroud 46 is closed at its upper end as indicated at 47 and the lower end is open and has an outside diameter which fits within the refractory lining at the entrance to the chamber 12. A protective jacket 31a is provided around the exterior of the tubular element 21 in the area of the inlet opening 19. The shroud 46 is provided with two diametrically disposed openings 48 as shown in FIGS. 5 and 6.

The effluent at relatively high temperatures enters the neck portion 14a of the housing at relatively high velocity and some of the inertia is dissipated by impact against the exterior of the shroud 46. The effluent within the chamber 49 moves through the openings 48 into the interior of the shroud. The jacket 31a protects the depending tubular element 21. The inertia upset in pressure is principally in the movement of the effluent through the openings 48 and is completely dissipated when the openings 48 are centered at least two diameters upstream from the zone where the effluent moves into contact with the air or the air and steam.

While the invention has been described with regard to structural characteristics of the apparatus it will be appreciated that changes may be made in the components as well as the overall assembly. Such changes and others may be made without departing from the spirit and scope of the invention as set forth in the appended claims.

What I claim and desire to secure by Letters aPtent is:

1. In apparatus for reforming a hydrocarbon, a housing having a combustion chamber, a neck portion forming a part of said housing in communication with the combustion chamber, a conduit extending through said neck portion, a burner head carried by said conduit and positioned within the combustion chamber, said burner head having discharge ports for releasing air or a mixture of air and steam from said conduit into said combustion chamber, said neck portion having an inlet opening with the axis thereof disposed radially of the axis of said conduit for admitting a hydrocarbon gaseous effluent into the neck portion, insulating means surrounding said conduit protecting it from the heat carried by the effluent means including an arcuate convex surface within said neck portion against which the effluent impacts to dissipate the inertia of the incoming effluent, stationary means operable to provide a pressure drop as the effluent moves within the neck portion towards the combustion chamber where the combustibles of the effluent burn in the presence of the air released by said burner head, and refractory means covering the burner head downstream of said discharge ports.

2. In apparatus for reforming a hydrocarbon in accordance with claim 1 wherein the stationary means for dissipating inertia of the incoming effluent includes a disc surroundng said conduit between the inlet opening and the combustion chamber and said disc having spaced holes therethrough.

3. In apparatus for reforming a hydrocarbon in accordance with claim 1 wherein the stationary means for dissipating the inertia of the incoming effluent comprises a cylindrical shaped shroud surrounding the conduit throughout the area of said inlet opening and having diametrically disposed openings therethrough above said inlet opening with the interior of the shroud in communication with said chamber.

References Cited

UNITED STATES PATENTS 2,205,554  6/1940  Brandegee et al. _____ 48—214

JAMES H. TAYMAN, Jr., Primary Examiner

U.S. Cl. X.R.

23—288; 48—196, 214; 260—679; 431—354